(12) United States Patent
Chan et al.

(10) Patent No.: US 8,189,910 B2
(45) Date of Patent: May 29, 2012

(54) COLOR INTERPOLATION METHOD FOR DIGITAL IMAGE

(75) Inventors: Chen-Hung Chan, Taoyuan County (TW); Ming-Jiun Liaw, Mialoi County (TW); Hong-Long Chou, Taipei (TW)

(73) Assignee: Altek Corporation, Hsinchu (TW)

( * ) Notice: Subject to any disclaimer, the term of this patent is extended or adjusted under 35 U.S.C. 154(b) by 560 days.

(21) Appl. No.: 12/479,327

(22) Filed: Jun. 5, 2009

(65) Prior Publication Data

US 2010/0310162 A1 Dec. 9, 2010

(51) Int. Cl.
*G06K 9/00* (2006.01)
(52) U.S. Cl. .................. 382/167; 382/162; 382/260
(58) Field of Classification Search .......... 382/167, 382/260, 274, 300, 162; 455/426.1, 414.1; 348/234, 273, 581, 222.1; 375/240.19, E7.093
See application file for complete search history.

(56) References Cited

U.S. PATENT DOCUMENTS 7,305,123 B2 * 12/2007 Messina et al. .............. 382/162

* cited by examiner

*Primary Examiner* — Anh Hong Do
(74) *Attorney, Agent, or Firm* — Morris Manning & Martin LLP; Tim Tingkang Xia, Esq.

(57) ABSTRACT

A color interpolation method for a digital image is described, includes the following steps. Edge information is generated according to the Bayer pattern. A Bayer pattern image is processed by a horizontal band-pass filter and a vertical band-pass filter to generate a horizontal edge signal and a vertical edge signal. A weight process implements a weight adjustment on the horizontal edge signal and the vertical edge signal to generate a luminance signal and outputs the luminance signal to a subtraction unit. The subtraction unit carries out an operation according to the Bayer pattern image and an output result of the weight process to generate a chrominance pattern. The chrominance pattern is compensated through a chrominance interpolation process, so as to generate image signal patterns of different colors. The image signal patterns of different colors are output to an adder for an add operation, thereby outputting a complete color image.

3 Claims, 25 Drawing Sheets

| Cg | 0 | Cg | 0 | Cg |
|----|---|----|---|----|
| 0  | Cg | 0 | Cg | 0 |
| Cg | 0 | Cg | 0 | Cg |
| 0  | Cg | 0 | Cg | 0 |
| Cg | 0 | Cg | 0 | Cg |

FIG. 4a

|      |      |      |      |     |
|------|------|------|------|-----|
| Cg   | Cg'  | Cg   | Cg'  | Cg  |
| Cg'  | Cg   | Cg'  | Cg   | Cg' |
| Cg   | Cg'  | Cg   | Cg'  | Cg  |
| Cg'  | Cg   | Cg'  | Cg   | Cg' |
| Cg   | Cg'  | Cg   | Cg'  | Cg  |

COLOR INTERPOLATION METHOD FOR DIGITAL IMAGE

BACKGROUND OF THE INVENTION

1. Field of the Invention

The present invention relates to a digital image processing method, and more particularly to a color interpolation method for a digital image by using a Bayer pattern.

2. Related Art

In a photosensitive element, an array formed by millions of photosensitive units (or pixels) covers a surface of a transducer. Once the photosensitive element receives lights, accumulated charges on the pixel array of the entire photosensitive element is read from one end of the photosensitive element. The accumulated charges are quantified by an analog front-end chip or a photosensitive processor.

In order to present a color image accurately, each pixel position on the transducer requires three color samples, which are normally three primary colors of red, green, and blue (RGB). However, if three layers of color photosensitive elements are disposed on the same pixel position, the cost of a digital camera may be greatly increased. Therefore, a process of using a color filter array (CFA) to receive lights for the color pixels is proposed. Currently, the most commonly used CFA is a Bayer pattern. As for the color distribution in the Bayer pattern, green pixels and red pixels are arranged alternately to form one row, blue pixels and green pixels are arranged alternately to form the next row, and the green pixels and the red pixels are alternately arranged or the blue pixels and the green pixels are alternately arranged to form subsequent rows. In the Bayer pattern, each pixel only has one color value, instead of having the other color values.

FIG. 1 is a schematic view of a Bayer pattern in the prior art. Referring to FIG. 1, a Bayer pattern 100 utilizes the principle that human eyes are more sensitive in recognizing green than recognizing red or blue. Therefore, in a CFA of the Bayer pattern 100, the number of green filters is twice of that of blue or red filters, such that every four pixels form one unit. The arrangement of the filters is described as follows: in the first row, red filters and green filters are arranged alternately; and in the next row, green filters and blue filters are arranged alternately.

Finally, a digital camera processor performs a color interpolation according to the quantity of light received by each pixel. Table 1 shows a partial list of a filter array of color pixels.

TABLE 1

| $G_1$ | $R_2$ | $G_3$ | $R_4$ |
| $B_5$ | $G_6$ | $B_7$ | $G_8$ |
| $G_9$ | $R_{10}$ | $G_{11}$ | $R_{12}$ |
| $B_{13}$ | $G_{14}$ | $B_{15}$ | $G_{16}$ |

For example, the interpolation operation is an interpolation of green pixels at positions of blue pixels and red pixels. Referring to FIG. 1, since four surrounding pixels all have real green pixels, a missing green pixel is recovered through interpolation by using the surrounding colors.

$$G'_7 = (G_3 + G_6 + G_8 + G_{11})/4, \quad \text{Equation 1}$$

$$R'_7 = (R_2 + R_4 + R_{10} + R_{12})/4, \quad \text{Equation 2}$$

$$B'_6 = (B_5 + B_7)/2, \quad \text{Equation 3}$$

In the above equations, G, R, and B respectively represent a real green pixel, a real red pixel, and a real blue pixel, and G', R', and B' respectively represent a green pixel value, a red pixel value, and a blue pixel value obtained through interpolation.

After the colors of the above color pixels are reconstructed, color correction values of all pixels of the Bayer pattern 100 may be obtained. After compensation, Table 2 is obtained as follows, which shows a list of colors of each compensated pixel.

TABLE 2

| $G_1R'_1B'_1$ | $G'_2R_2B'_2$ | $G_3R'_3B'_3$ | $G'_4R_4B'_4$ |
| $G'_5R'_5B_5$ | $G_6R'_6B'_6$ | $G'_7R'_7B_7$ | $G_8R'_8B'_8$ |
| $G_9R'_9B'_9$ | $G'_{10}R_{10}B'_{10}$ | $G_{11}R'_{11}B'_{11}$ | $G'_{12}R_{12}B'_{12}$ |
| $G'_{13}R'_{13}B_{13}$ | $G_{14}R'_{14}B'_{14}$ | $G'_{15}R'_{15}B_{15}$ | $G_{16}R'_{16}B'_{16}$ |

When $G'_7$ is interpolated, only four neighboring G pixels in the upper, lower, left, and right directions are used, and important information on $B_7$ fails to be fully utilized, thereby resulting in a poor image resolution after interpolation.

SUMMARY OF THE INVENTION

In view of the above problems, the present invention is mainly directed to a color interpolation method for a digital image, which performs a pixel interpolation of a digital image according to a Bayer pattern.

In order to achieve the above objective, the present invention provides a color interpolation method for a digital image, which includes the steps of: setting a selection window; performing a pixel edge processing process on the selection window to generate a horizontal edge signal and a vertical edge signal; generating a luminance pattern according to the horizontal edge signal and the vertical edge signal; performing a chrominance preprocessing on each pixel in a Bayer pattern by using the generated luminance pattern to generate a chrominance pattern; outputting a green chrominance pattern, a red chrominance pattern, and a blue chrominance pattern respectively from the chrominance pattern according to different color pixels; performing a chrominance interpolation process on the green chrominance pattern, the red chrominance pattern, and the blue chrominance pattern respectively to obtain a compensated green chrominance pattern, a compensated red chrominance pattern, and a compensated blue chrominance pattern; adding the compensated green chrominance pattern, the compensated red chrominance pattern, and the compensated blue chrominance pattern to the luminance pattern respectively, so as to generate a green image signal pattern, a red image signal pattern, and a blue image signal pattern; and synthesizing the green image signal pattern, the red image signal pattern, and the blue image signal pattern to generate an output image.

The present invention provides a color interpolation method that integrates a luminance filtering with a chrominance filtering for a digital image, so as to improve an image resolution of the digital image.

BRIEF DESCRIPTION OF THE DRAWINGS

The present invention will become more fully understood from the detailed description given herein below for illustration only, which thus is not limitative of the present invention, and wherein:

FIG. 4a is a schematic view of a chrominance interpolation for a green chrominance pattern;

FIG. 4d is a schematic view of non-green pixels in the green chrominance pattern after completing the compensation;

FIG. 5b is a schematic view of a interpolation for a red chrominance pattern;

FIG. 5e is a schematic view of all non-red pixels in the red chrominance pattern after completing the compensation;

FIG. 6a is a schematic view of a interpolation for a blue chrominance pattern;

FIG. 6b is a schematic view of a interpolation for a blue chrominance pattern;

FIG. 6c is a schematic view of a interpolation for a blue chrominance pattern;

DETAILED DESCRIPTION OF THE INVENTION

Figure 1:
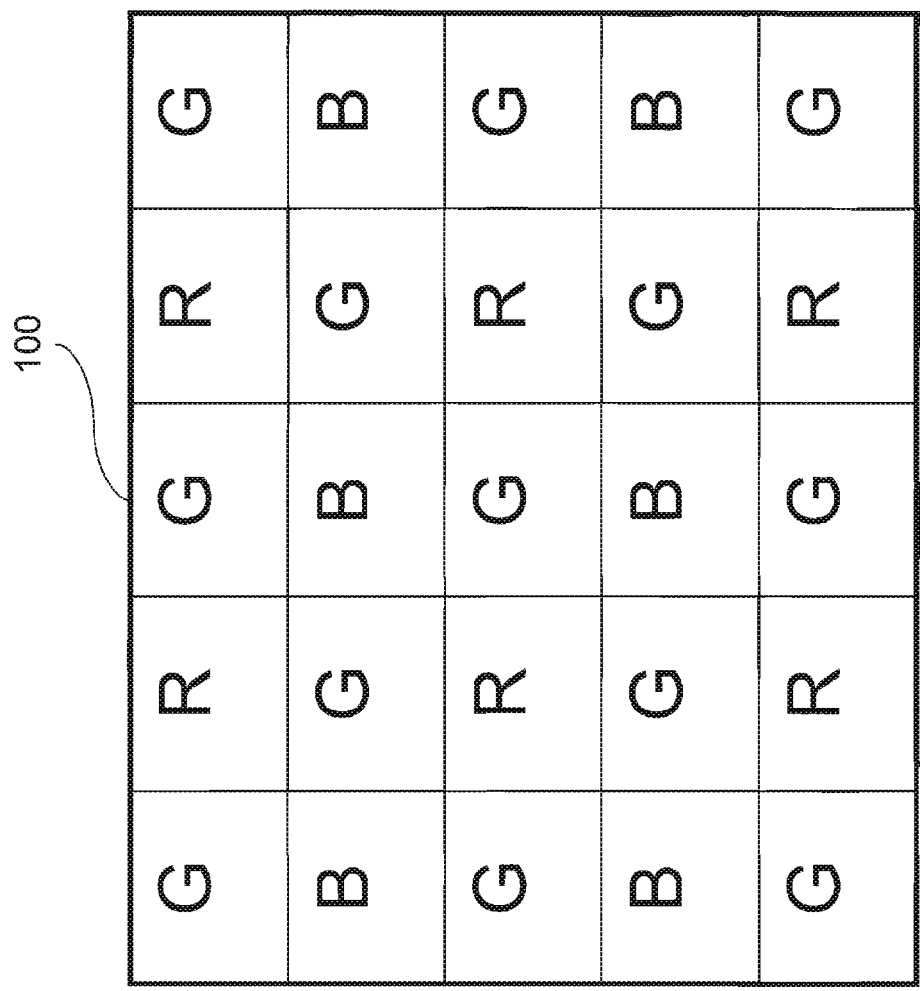
FIG. 1 is a schematic view of a Bayer pattern in the prior art.
Figure 2A:
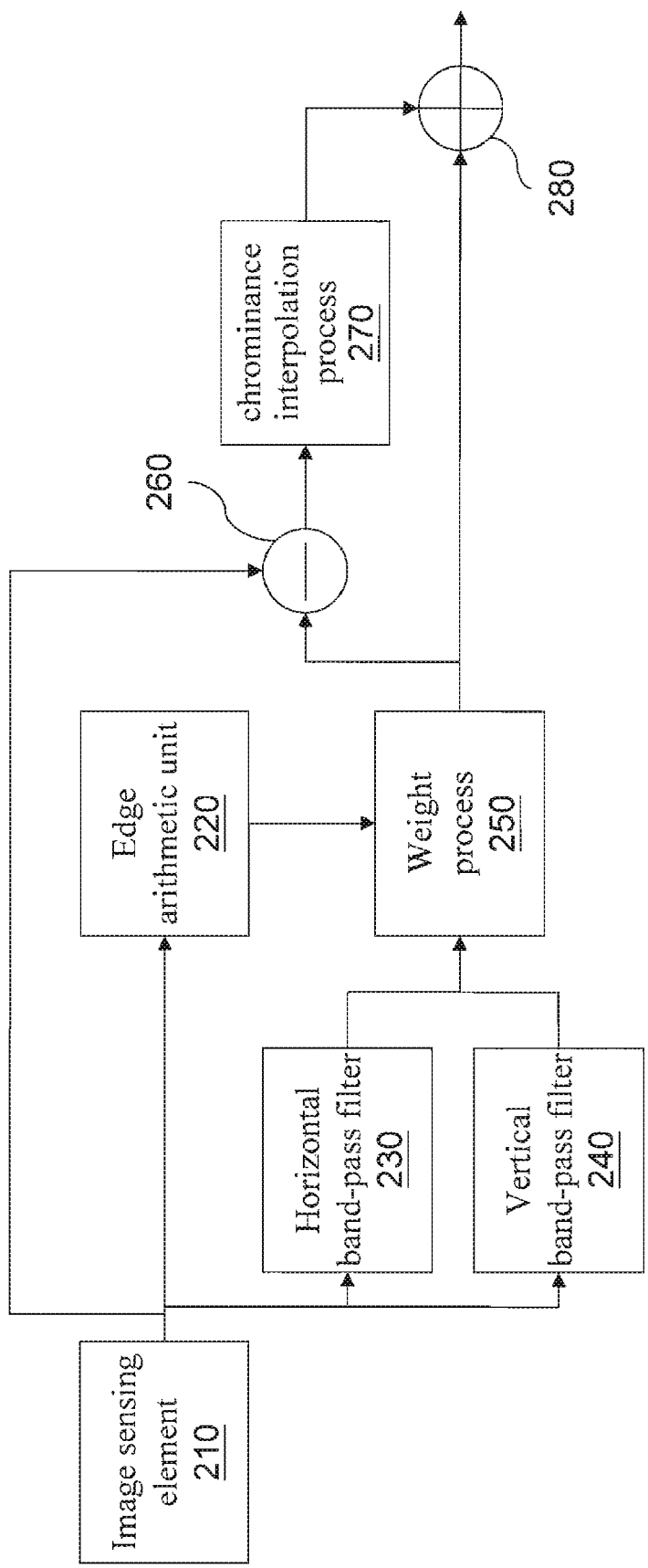
FIG. 2a is a schematic architectural view of the present invention.

FIG. 2a is a schematic architectural view of the present invention. Referring to FIG. 2a, the architecture of the present invention includes an image sensing element 210, an edge arithmetic unit 220, a horizontal band-pass filter 230, a vertical band-pass filter 240, a weight process 250, a subtraction unit 260, a chrominance interpolation process 270, and an adder 280.

The image sensing element 210 generates a Bayer pattern according to a received photoelectric signal and outputs the Bayer pattern to the edge arithmetic unit 220, the horizontal band-pass filter 230, and the vertical band-pass filter 240. The edge arithmetic unit 220 generates edge information according to the Bayer pattern. Meanwhile, the Bayer pattern is respectively processed by the horizontal band-pass filter 230 and the vertical band-pass filter 240 to generate a horizontal edge signal and a vertical edge signal, and the horizontal edge signal and the vertical edge signal are output to the weight process 250 for being processed. The weight process 250 performs a weight adjustment on the horizontal edge signal and the vertical edge signal to generate a luminance signal and outputs the luminance signal to the subtraction unit 260. The subtraction unit 260 carries out an operation according to the Bayer pattern and an output result of the weight process 250 to generate a chrominance pattern. Each pixel in the chrominance pattern is compensated by the chrominance interpolation process 270 to generate image signal patterns of different colors. Finally, the image signal patterns of different colors are output to the adder 280, and the adder 280 adds the luminance signal to the image signal patterns of different colors, thereby outputting a complete color image.

Figure 2B:
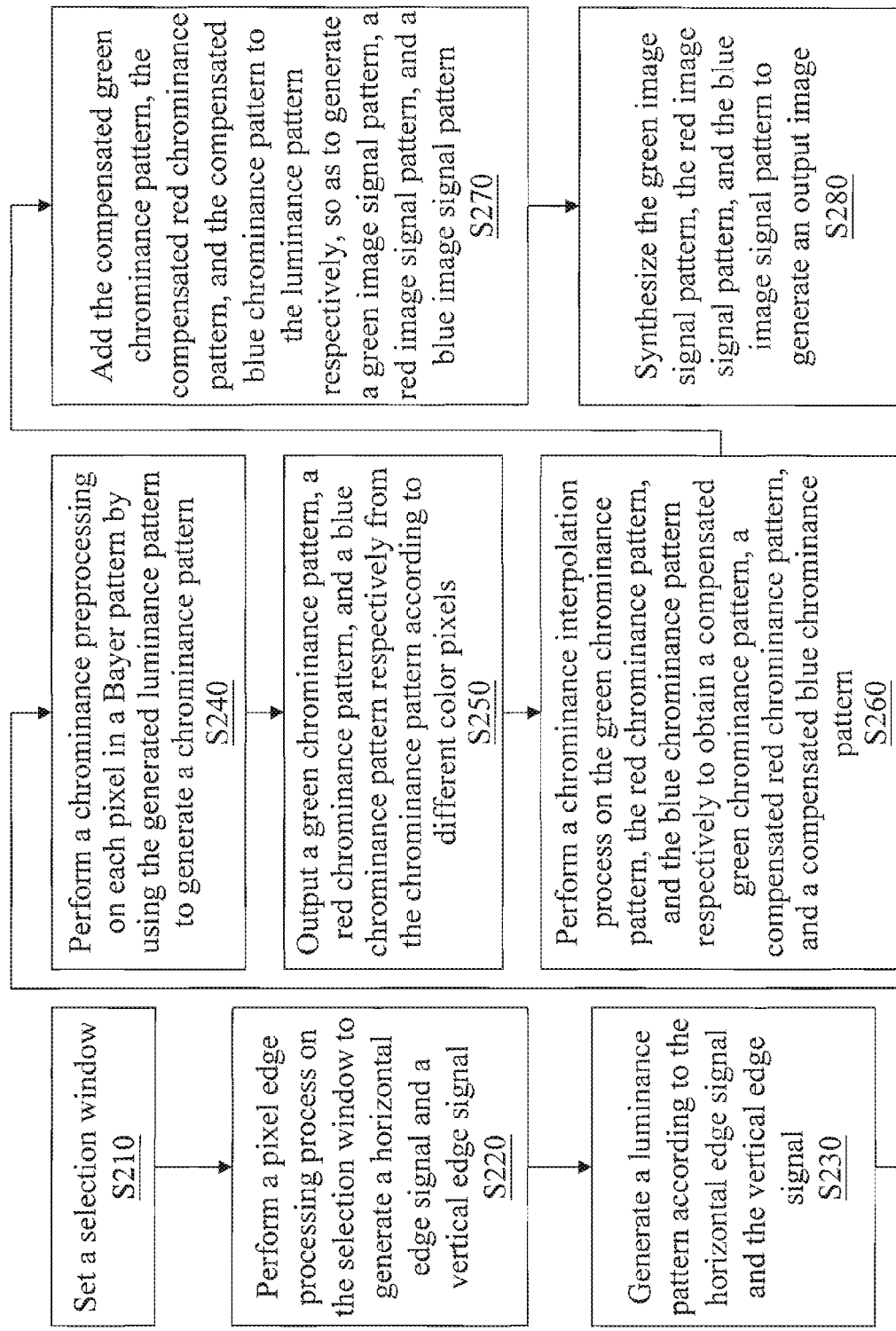
FIG. 2b is a schematic flow chart of operations of the present invention.

FIG. 2b is a schematic flow chart of operations of the present invention. To further illustrate the operation flow of the present invention, referring to FIG. 2b, a color interpolation method for a digital image of the present invention includes the following steps. A selection window is set (Step S210), in which an n*n pixel array is selected from a Bayer pattern. In this embodiment, the selection window is set to be a 5*5 pixel array; however, the size of the array is not limited hereby. Afterwards, a pixel edge processing process is performed on the selection window to generate a horizontal edge signal and a vertical edge signal (Step S220), and a horizontal edge signal and a vertical edge signal corresponding to each pixel in the Bayer pattern are generated. The selection window is shifted pixel by pixel.

Figure 3A:
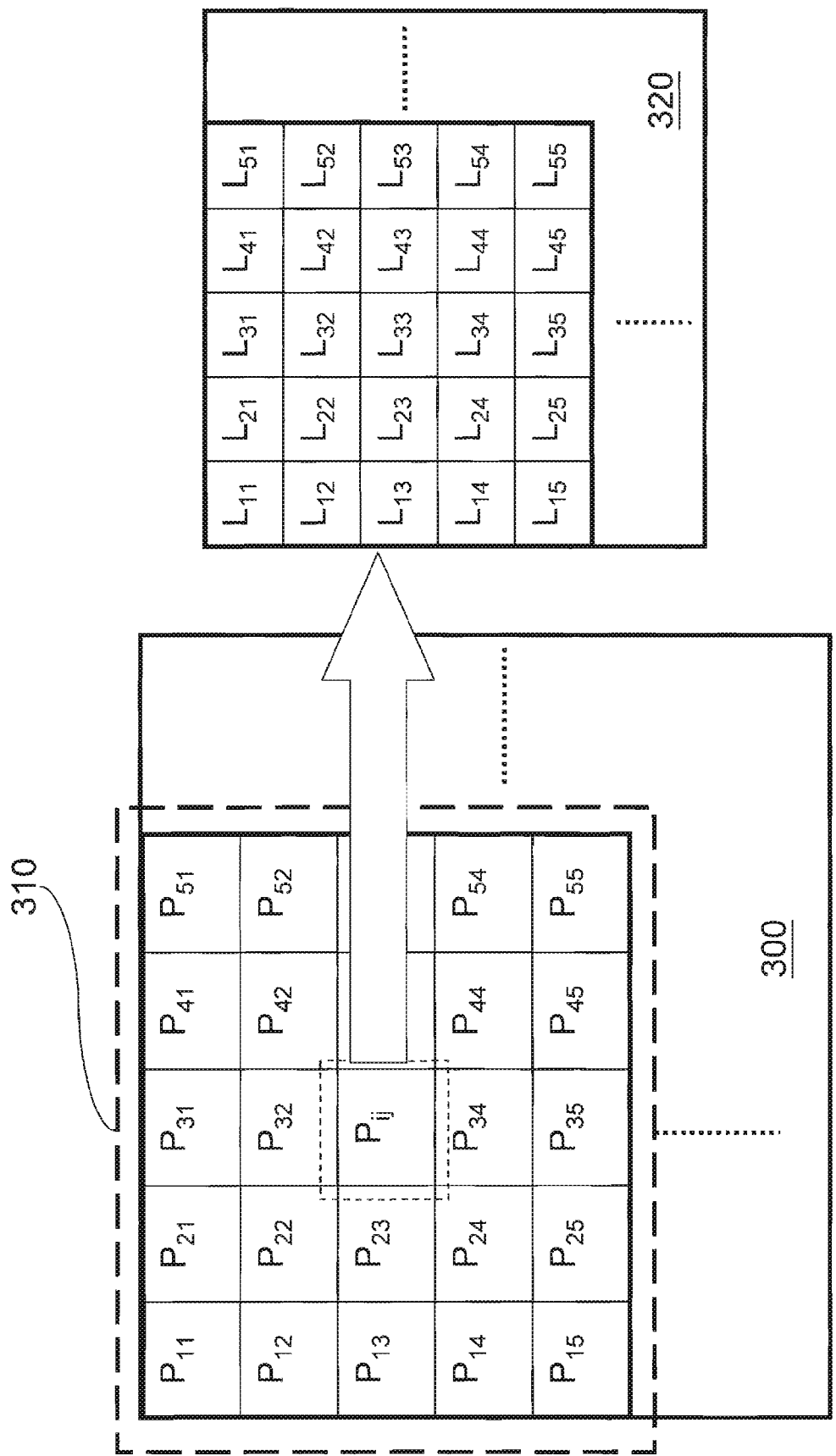
FIG. 3a is a schematic view of an arrangement of pixels in a selection window.

FIG. 3a is a schematic view of an arrangement of pixels in a selection window. Referring to FIG. 3a, $P_{ij}$ represents a pixel position (i, j) (i.e., the dashed-line frame in FIG. 3a). Herein, a pixel $P_{3,3}$ in FIG. 3a is taken as an example for illustrating the generation and processing of a horizontal signal and a vertical signal. Eh is a horizontal edge signal of a pixel, and Ev is a vertical edge signal of a pixel. Lh is a value generated by a horizontal band-pass filter, and Lv is a value generated by a vertical band-pass filter. Each pixel in the figure has the above four types of signals (Eh, Ev, Lh, and Lv).

An operation indicated by Equation 4 below serves as an operation of the horizontal band-pass filter 230 used in the present invention, which is performed on the pixel $P_{3,3}$ to generate a horizontal edge signal of a selection window 310.

$$Eh_{33}=|P_{22}-P_{42}+P_{23}-P_{43}+P_{24}-P_{44}|  \quad\text{Equation 4}$$

In Equation 4, $Eh_{ij}$ represents an image horizontal edge signal at a pixel position (i, j). The selection window 310 is moved to another area of a Bayer pattern 300. Meanwhile, the operation indicated by Equation 4 is performed on the pixel $P_{3,3}$ in the selection window 310, until all pixels in the Bayer pattern 300 have finished the operation indicated by Equation 4, thereby generating a horizontal edge signal pattern (not shown in FIG. 3a). Likewise, an operation as indicated by Equation 5 below is performed on the pixel $P_{3,3}$ in FIG. 3a, so as to generate a vertical edge signal value.

$$Ev_{33}=|P_{22}-P_{24}+P_{32}-P_{34}+P_{42}-P_{44}|  \quad\text{Equation 5}$$

In Equation 5, $Ev_{ij}$ represents an image vertical edge weight value at a pixel position (i, j). For example, when the selection window is shifted rightwards, the selection window is shifted rightwards by one pixel. Likewise, when the selection window is shifted downwards, the selection window is shifted downwards by one pixel. The operations indicated by Equation 5 and Equation 6 are repeatedly performed on each pixel in the Bayer pattern 300 by using the selection window 310 until all the pixels in the Bayer pattern 300 have finished such operations, thereby generating a vertical edge signal pattern (not shown in FIG. 3a).

Next, a luminance pattern is generated according to the horizontal edge signal and the vertical edge signal (Step S230). In the present invention, corresponding luminance information is output by using the weight process 250 according to different color pixels (with reference to Equation 6).

$$L_{ij} = \frac{Ev_{ij}}{Ev_{ij}+Eh_{ij}}*L_h + \frac{Eh_{ij}}{Ev_{ij}+Eh_{ij}}*L_v \qquad \text{Equation 6}$$

In Equation 6, $L_{ij}$ is a pixel position (i, j) in a selection window. Different color pixels in the Bayer pattern 300 are provided with different weights for compensation, and the compensated pixels are sequentially arranged to generate a luminance pattern. The given weight value varies with different color pixels.

Figure 3B:
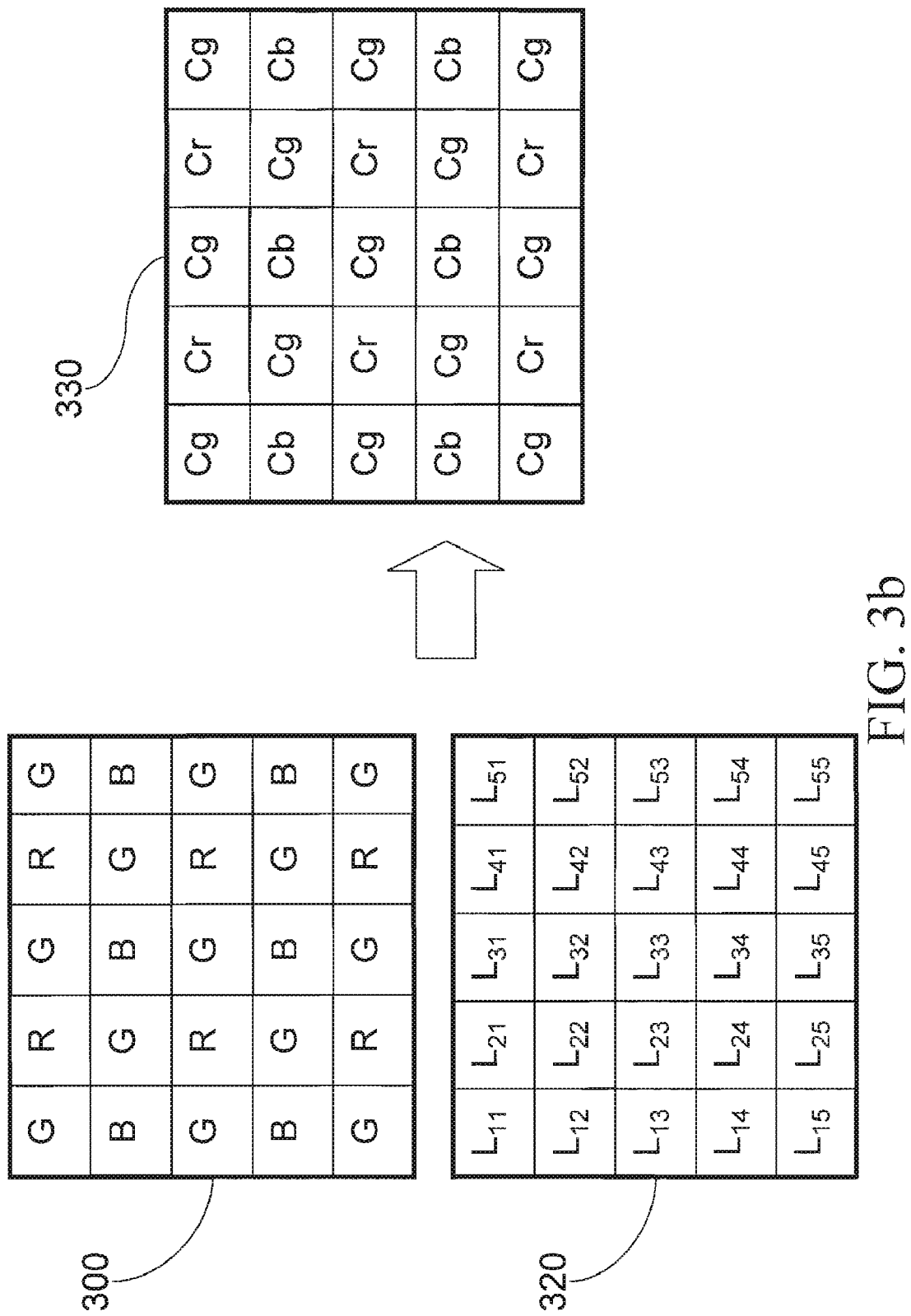
FIG. 3b is a schematic view of a motion of subtracting a luminance pattern from a Bayer pattern to generate a chrominance pattern.

Then, a chrominance preprocessing is performed on each pixel in the Bayer pattern by using the generated luminance pattern (Step S240), in which a subtraction operation is performed between the color pixel positions in the Bayer pattern 300 and corresponding pixel positions in a luminance pattern 320, and then, a subtraction result is output as a chrominance pattern 330. FIG. 3b is schematic view of a motion of subtracting a luminance pattern from a Bayer pattern to generate a chrominance pattern. Corresponding color pixels in the Bayer pattern 300 and the luminance pattern are processed by the subtraction unit 260 according to Equation 7, Equation 8, and Equation 9 below.

$$Cg_{ij} = G_{ij} - L_{ij} \qquad \text{Equation 7}$$

$$Cr_{ij} = R_{ij} - L_{ij} \qquad \text{Equation 8}$$

$$Cb_{ij} = B_{ij} - L_{ij} \qquad \text{Equation 9}$$

In the above equations, $G_{ij}$ is a position of a green pixel in the Bayer pattern, $Cg_{ij}$ is a luminance value of a position corresponding to $G_{ij}$; $R_{ij}$ is a position of a red pixel in the Bayer pattern, $Cr_{ij}$ is a luminance value of a position corresponding to $R_{ij}$; $B_{ij}$ is a position of a blue pixel in the Bayer pattern, $Cb_{ij}$ is a luminance value of a position corresponding to $B_{ij}$; and $L_{ij}$ is a pixel position in the luminance pattern.

Figure 3C:
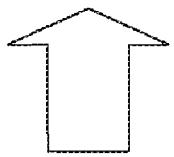
FIG. 3c is a schematic view of a luminance pattern of green pixels.
Figure 3D:
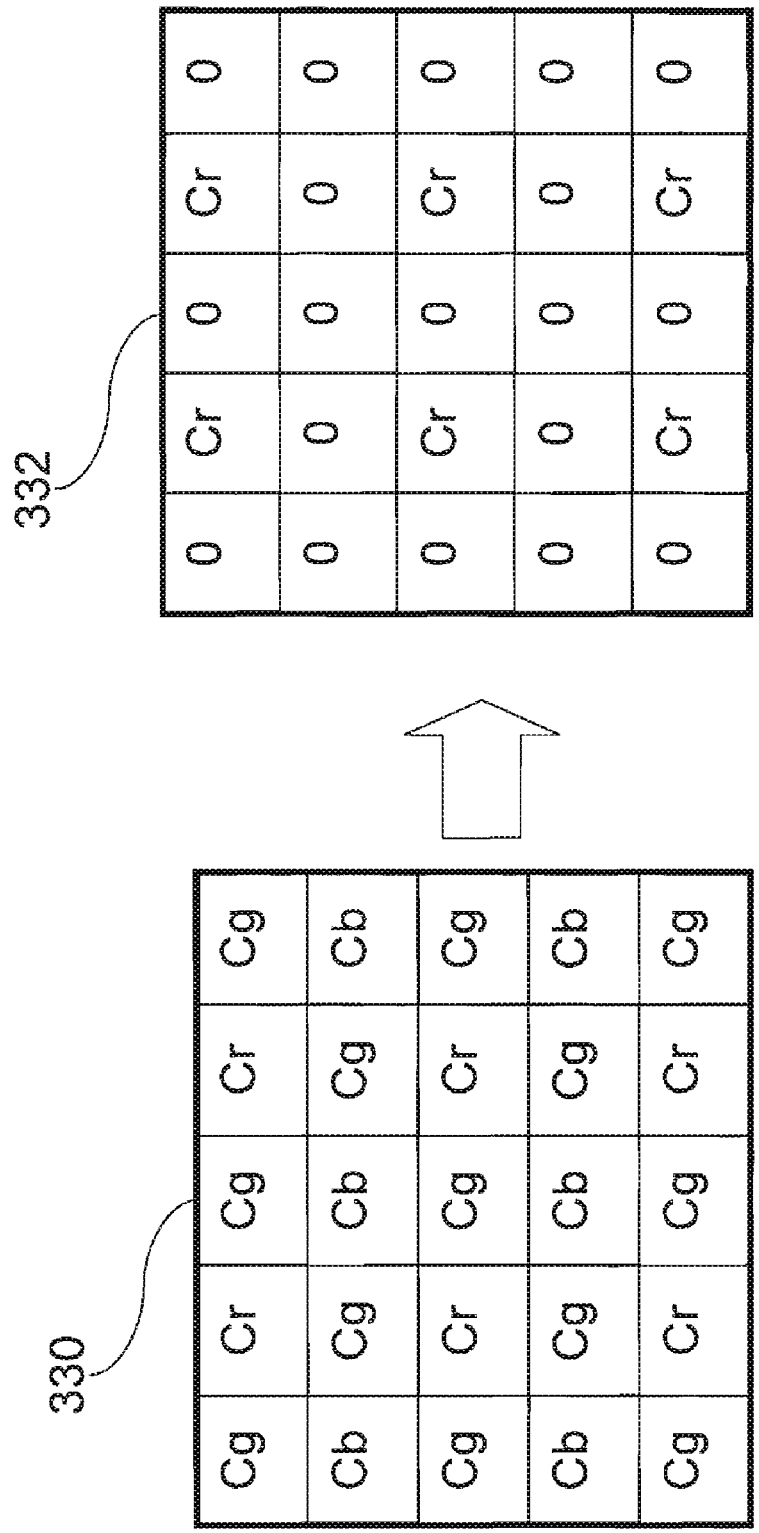
FIG. 3d is a schematic view of a luminance pattern of red pixels.
Figure 3E:
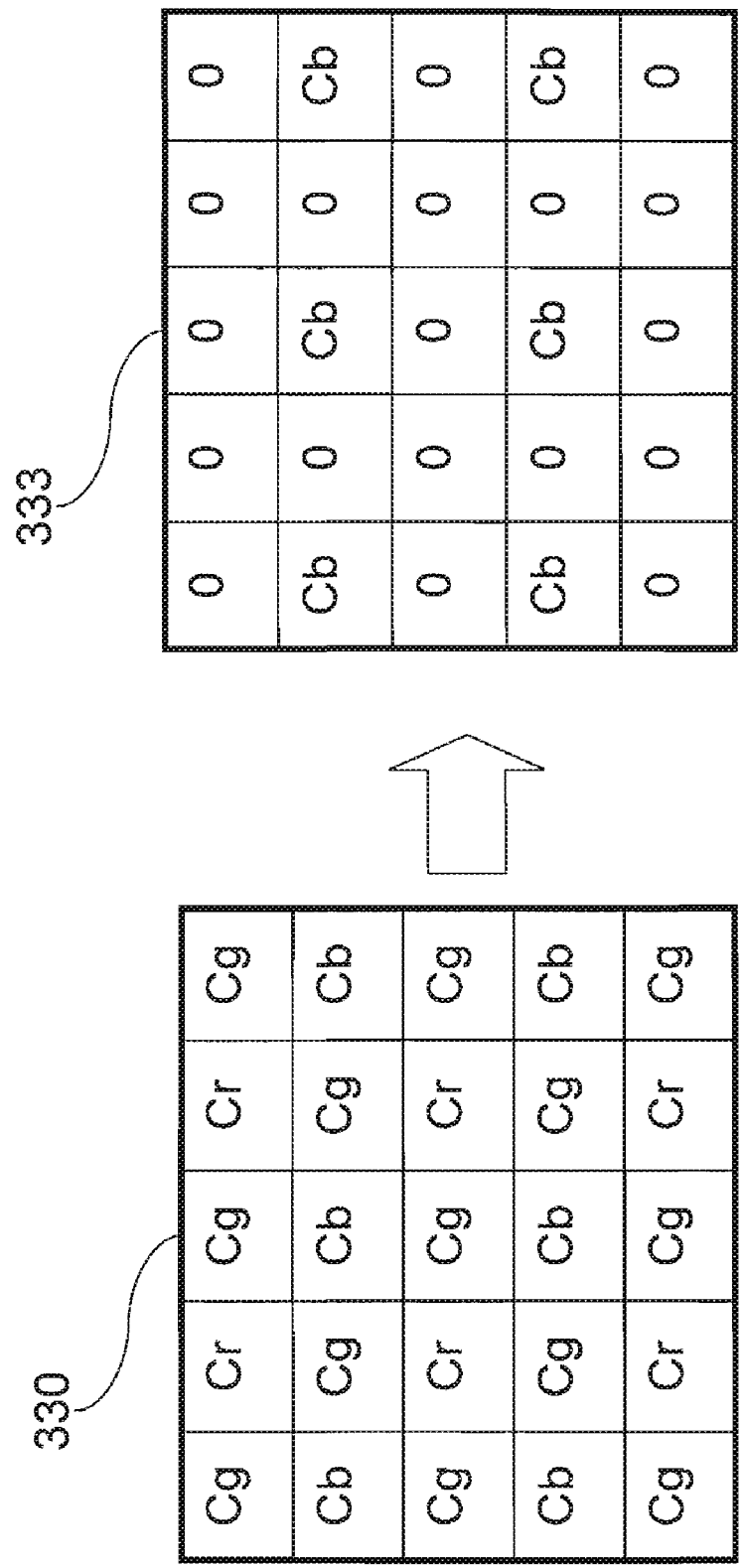
FIG. 3e is a schematic view of a luminance pattern of blue pixels.

Then, a green chrominance pattern, a red chrominance pattern, and a blue chrominance pattern are respectively output from the chrominance pattern according to different color pixels (Step S250), and they are sequentially arranged according to positions of the color pixels in the luminance pattern. In a corresponding color chrominance pattern of a color pixel, the other color pixel values are set to "0". FIGS. 3c, 3d, and 3e are respectively schematic views of a luminance pattern of a different color pixel. For example, if it intends to generate a green chrominance pattern 331 from the chrominance pattern 330, green pixels in the chrominance pattern 330 of FIG. 3b are maintained, and the other color pixels are set to "0", as shown in FIG. 3c, and this result is defined as the green chrominance pattern 331. Likewise, the other color pixels are processed in the same way, so as to generate a red chrominance pattern 332 and a blue chrominance pattern 333.

Figure 4B:
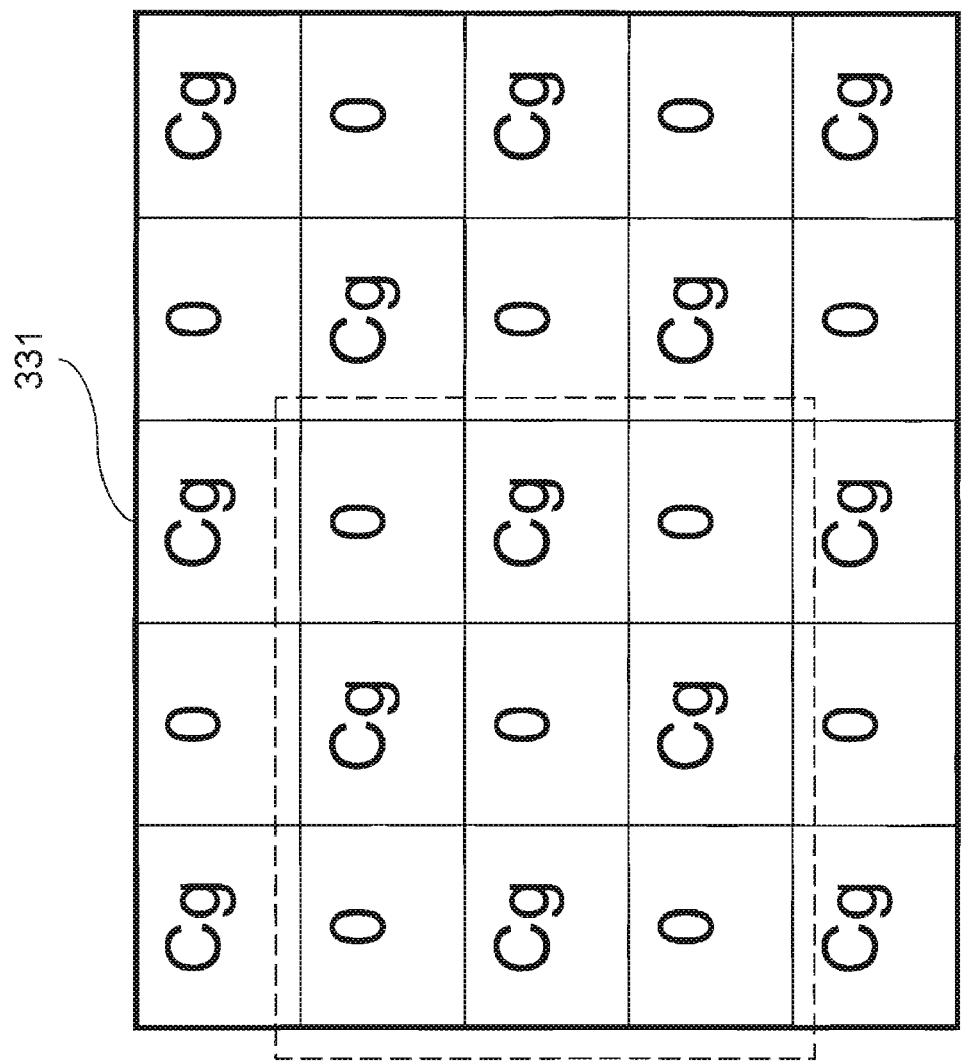
FIG. 4b is a schematic view of a chrominance interpolation for a green chrominance pattern.
Figure 4C:
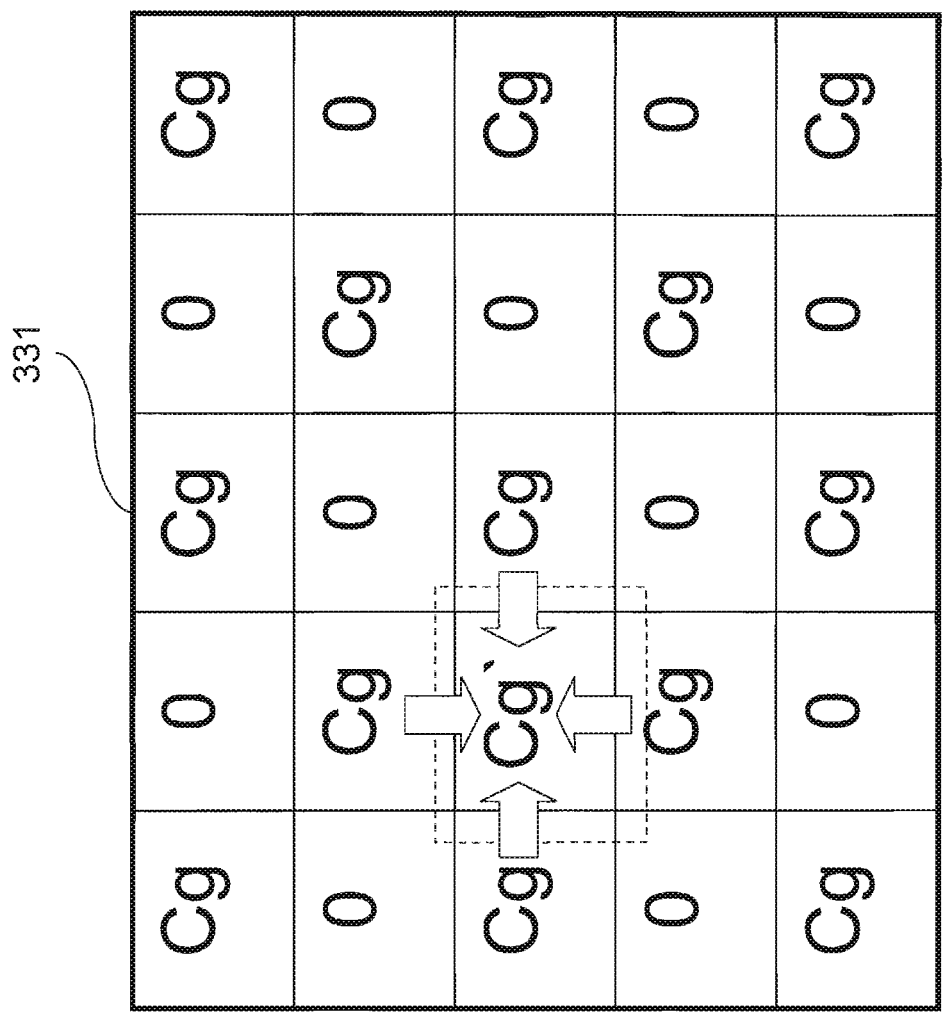
FIG. 4c is a schematic view of a chrominance interpolation for a green chrominance pattern.

Then, a chrominance interpolation process is respectively performed on the green chrominance pattern, the red chrominance pattern, and the blue chrominance pattern to obtain a compensated green chrominance pattern, a compensated red chrominance pattern, and a compensated blue chrominance pattern (Step S260). The chrominance interpolation process 270 is used to perform chrominance interpolation on the color pixel values of "0" in the chrominance pattern 330. Since different color chrominance patterns are respectively compensated through different manners in the present invention, the green chrominance pattern 331, the red chrominance pattern 332, and the blue chrominance pattern 333 are respectively illustrated herein, so as to describe the respective compensation process clearly. Firstly, the chrominance interpolation process for the green chrominance pattern 331 is illustrated. FIGS. 4a, 4b, and 4c are respectively schematic views of a chrominance interpolation for a green chrominance pattern. A non-green pixel (i.e., one of the above color pixels that are set to "0"), for example, a pixel shown in the dashed-line frame of FIG. 4a, is selected from the green chrominance pattern 331. Then, green pixels surrounding the non-green pixel (referring to green pixels in the dashed-line frame of FIG. 4b) are added together, and an average value Cg thereof is calculated. The selected non-green pixel in FIG. 4a is set to the generated average value, as shown by "Cg" in FIG. 4c. The above processing steps are repeatedly performed on each non-green pixel in the green chrominance pattern 331, until all non-green pixels in the green chrominance pattern 331 have finished the above processing. FIG. 4d is a schematic view of non-green pixels in the green chrominance pattern after completing the compensation.

Figure 5A:
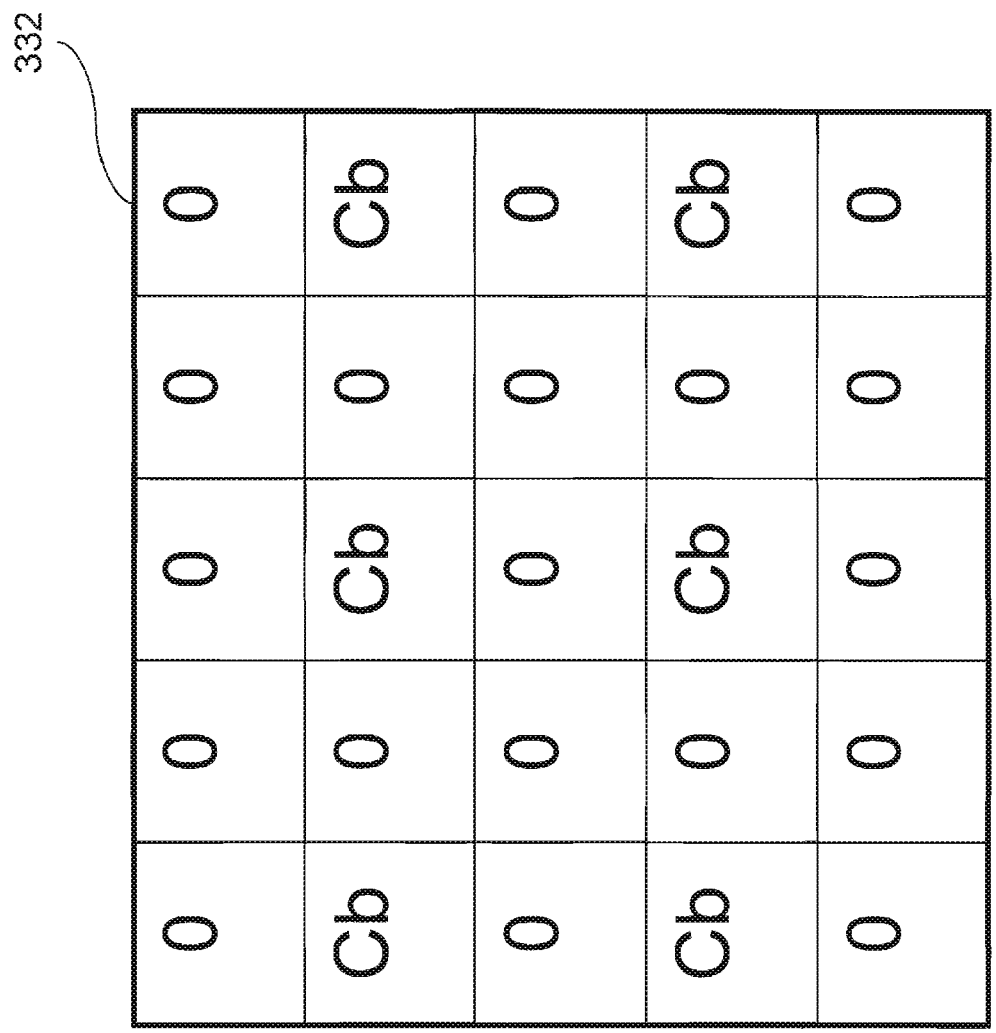
FIG. 5a is a schematic view of a interpolation for a red chrominance pattern.
Figure 5B:
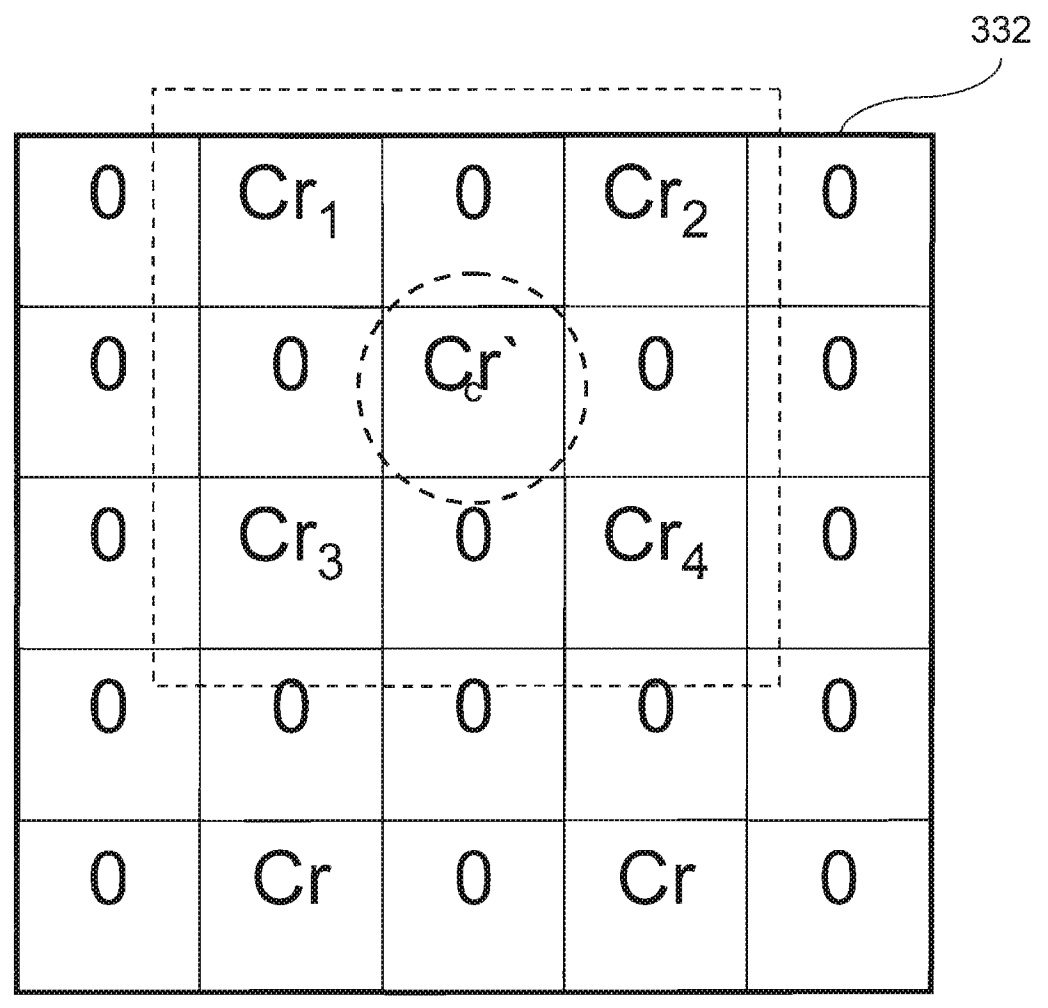
Figure 5C:
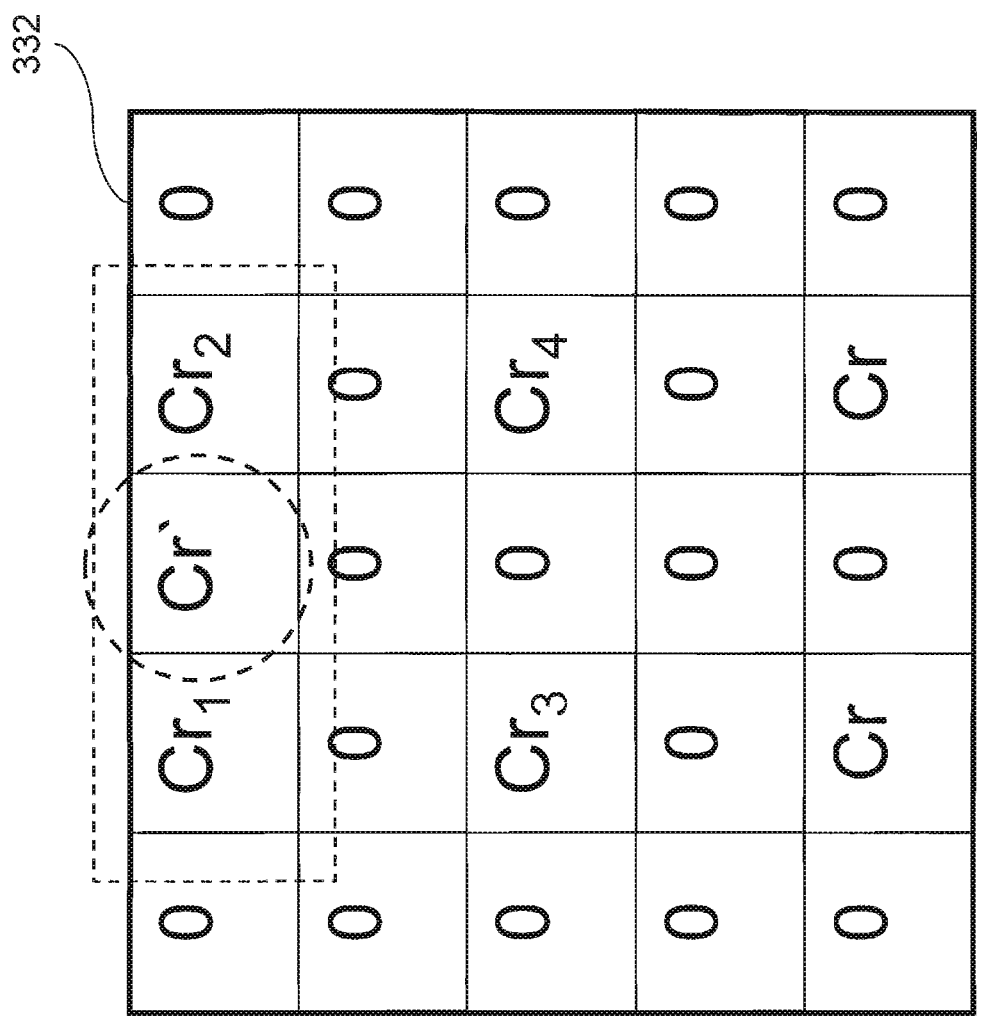
FIG. 5c is a schematic view of a interpolation for a red chrominance pattern.

Next, the chrominance interpolation process for the red chrominance pattern 332 is illustrated. FIGS. 5a, 5b, and 5c are respectively schematic views of a compensation for a red chrominance pattern. Due to the distribution features of red pixels in the red chrominance pattern 332, non-red pixels in the red chrominance pattern 332 are compensated respectively according to the following circumstances in the present invention.

First State:

Referring to FIG. 5b, the distribution shown in the dashed-line square is defined as a first distribution state of red pixels, and a non-red pixel Cr' (as shown by the dashed-line circle) in the red chrominance pattern 332 is compensated. Red pixels ($Cr_1$, $Cr_2$, $Cr_3$, and $Cr_4$) surrounding the non-red pixel Cr' to be compensated are added together and an average value thereof is calculated. Then, the generated average value is taken as a value for the non-red pixel to be compensated. In other words, the compensation value for the non-red pixel is.

$$Cr' = \frac{Cr_1 + Cr_2 + Cr_3 + Cr_4}{4}$$

Second State:

Referring to FIG. 5c, the distribution shown in the dashed-line rectangle is defined as a second distribution state of red pixels, and a non-red pixel Cr' (as shown by the dashed-line circle) in the red chrominance pattern 332 is compensated. Red pixels ($Cr_1$ and $Cr_2$) adjacent to the non-red pixel Cr' to be compensated are added together and an average value thereof is calculated. Then, the generated average value is taken as a value for the non-red pixel to be compensated. In other words, the compensation value for the non-red pixel is.

$$Cr' = \frac{Cr_1 + Cr_2}{2}$$

Figure 5D:
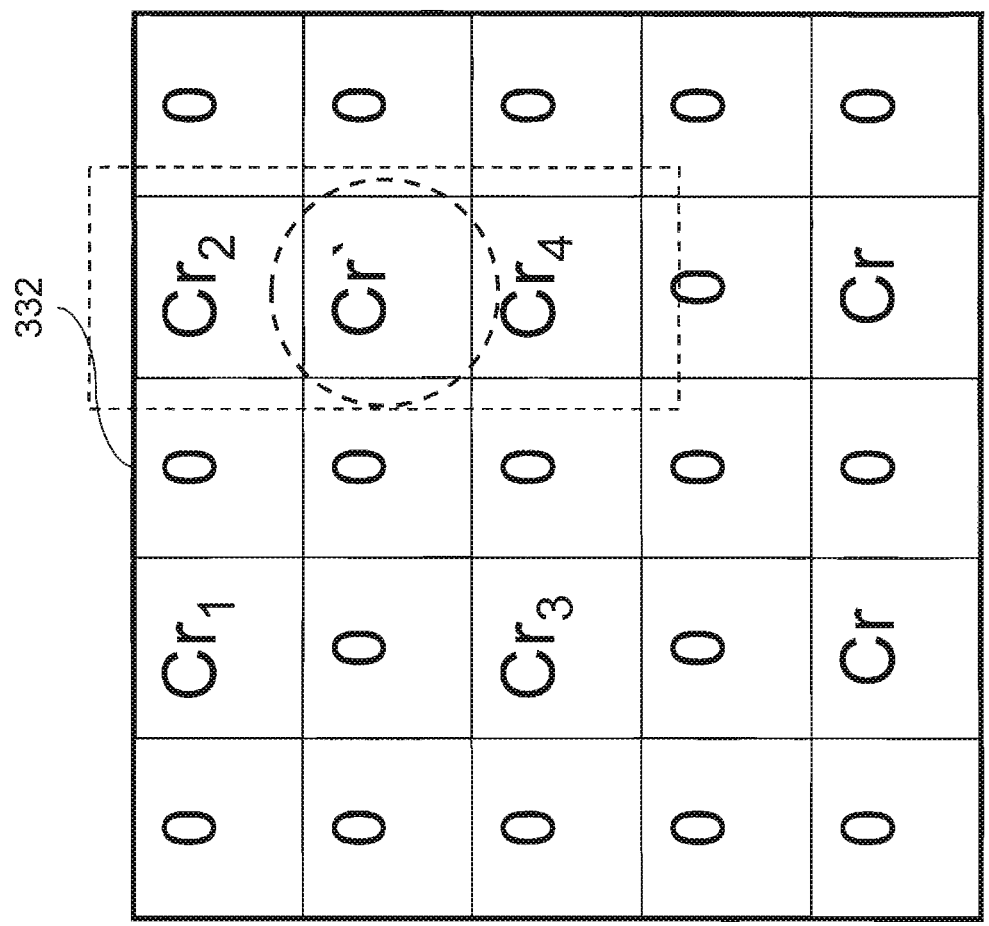
FIG. 5d is a schematic view of a third distribution state of red pixels, and a non-red pixel Cr' in the red chrominance pattern.

Third State:

Referring to FIG. 5d, the distribution shown in the dashed-line rectangle is defined as a third distribution state of red pixels, and a non-red pixel Cr' (as shown by the dashed-line circle) in the red chrominance pattern 332 is compensated.

Red pixels ($Cr_2$ and $Cr_4$) adjacent to the non-red pixel Cr' to be compensated are added together and an average value thereof is calculated. Then, the generated average value is used as a value for the non-red pixel to be compensated. In other words, the compensation value for the non-red pixel is $$Cr' = \frac{Cr_2 + Cr_4}{2}$$

Figure 5E:
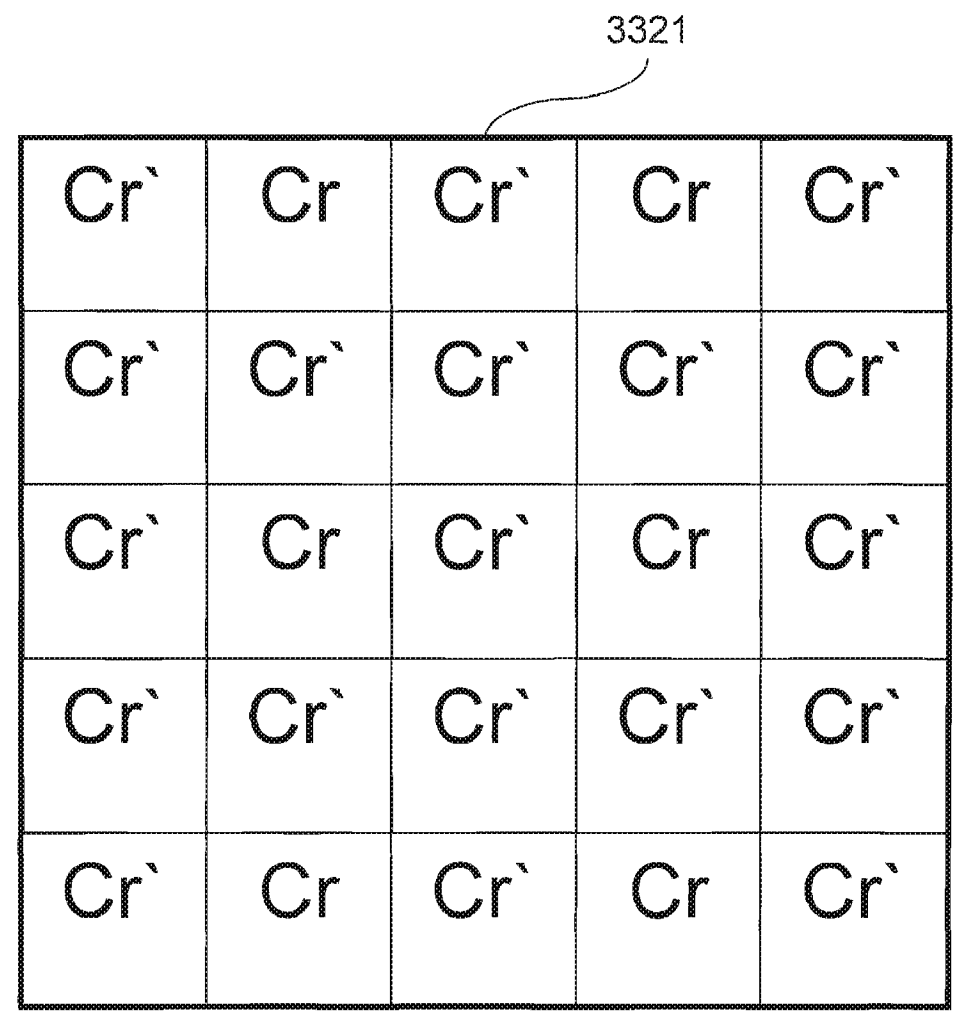

Finally, the above non-red pixel is filled into a corresponding position in the red chrominance pattern 332. FIG. 5e is a schematic view of all non-red pixels in the red chrominance pattern after completing the compensation.

Figure 6A:
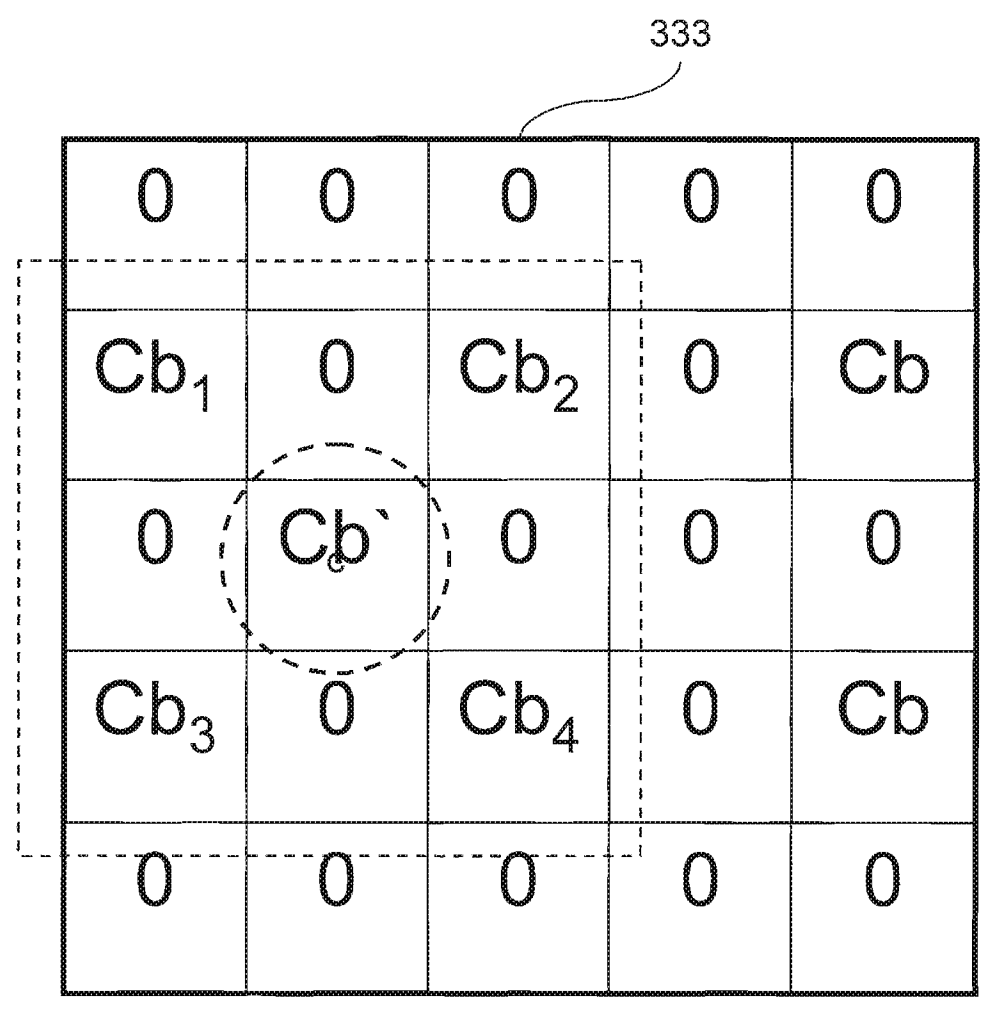
Figure 6B:
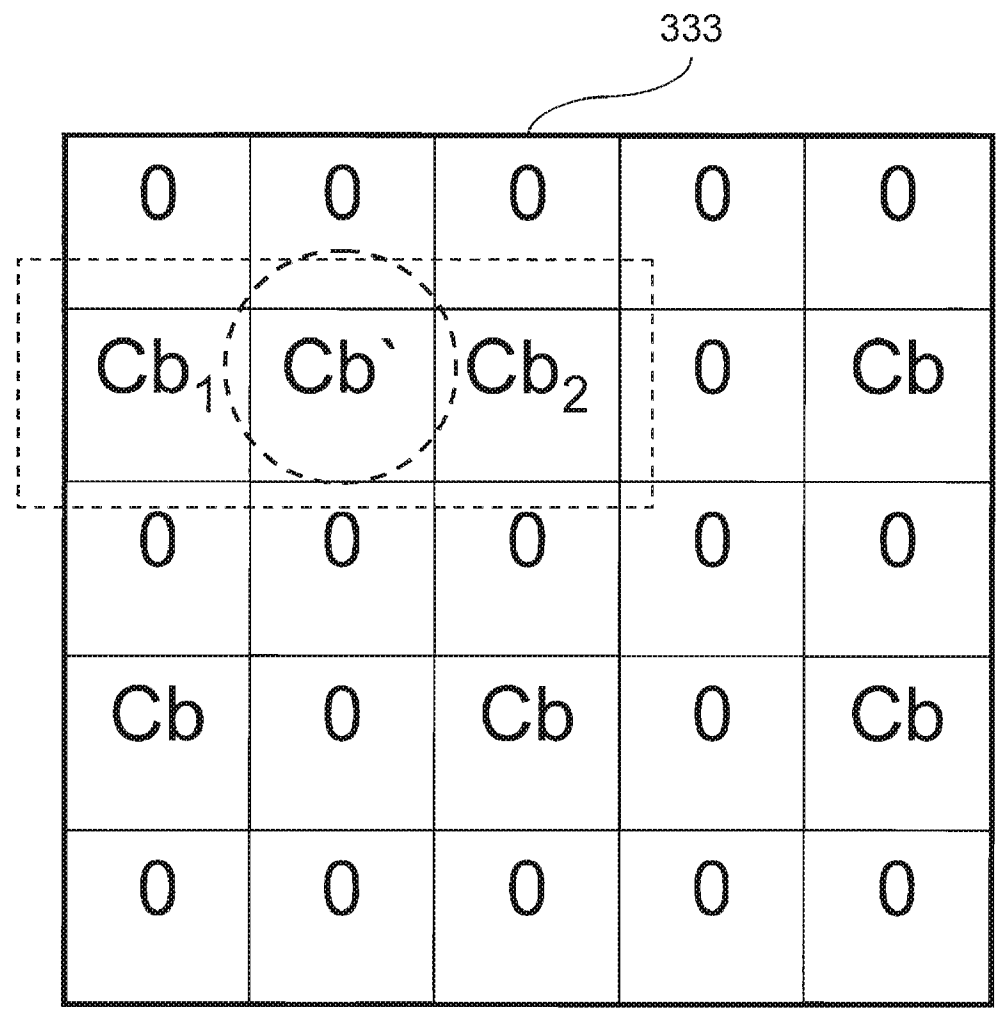
Figure 6C:
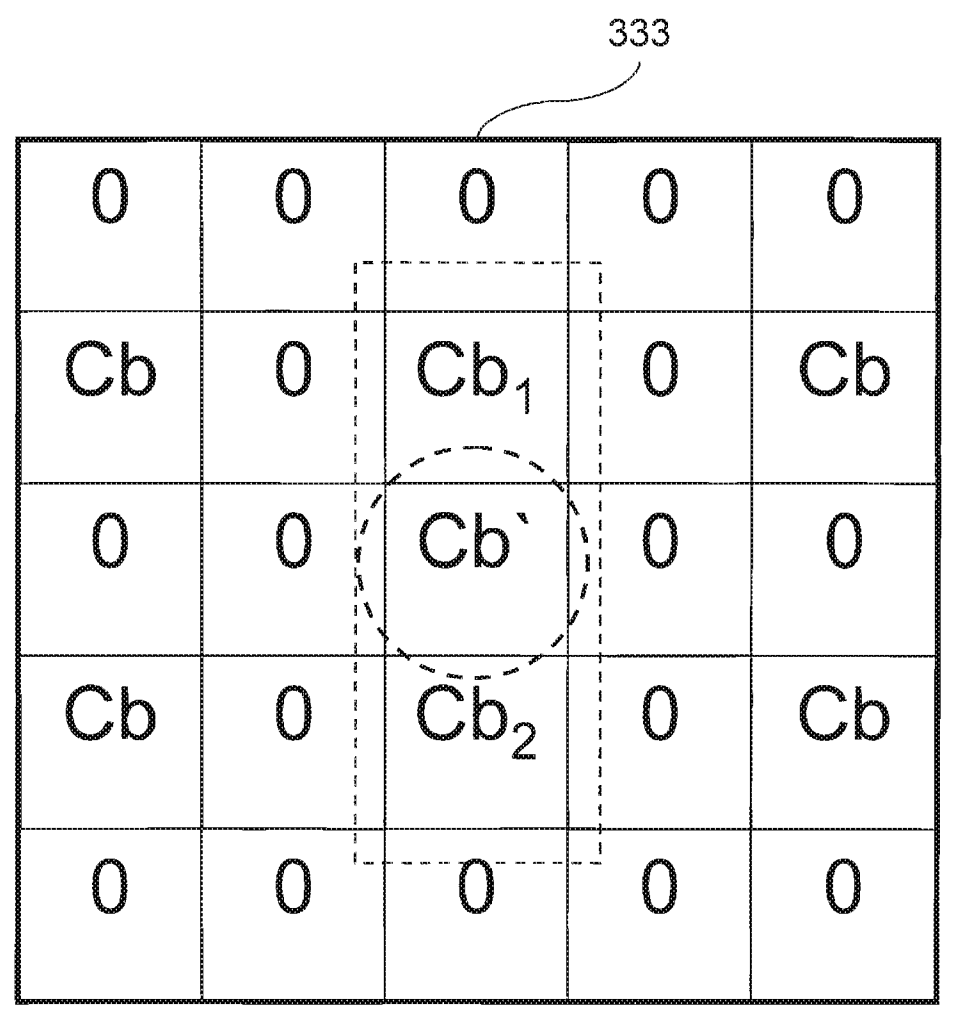

Then, the chrominance interpolation process for the blue chrominance pattern 333 is illustrated. FIGS. 6a, 6b, and 6c are respectively schematic views of a compensation for a blue chrominance pattern. Due to the distribution features of blue pixels in the blue chrominance pattern 333, non-blue pixels in the blue chrominance pattern 333 are compensated respectively according to the following circumstances in the present invention.

First State:

Referring to FIG. 6a, the distribution shown in the dashed-line square is defined as a first distribution state of blue pixels, and a non-blue pixel Cb' (as shown by the dashed-line circle) in the blue chrominance pattern 333 is compensated. Blue pixels ($Cb_1$, $Cb_2$, $Cb_3$, and $Cb_4$) surrounding the non-blue pixel Cb' to be compensated are added together and an average value thereof is calculated. Then, the generated average value is taken as a value for the non-blue pixel to be compensated. In other words, the compensation value for the non-blue pixel is $$Cb' = \frac{Cb_1 + Cb_2 + Cb_3 + Cb_4}{4}$$

Second State:

Referring to FIG. 6b, the distribution shown in the dashed-line rectangle is defined as a second distribution state of blue pixels, and a non-blue pixel Cb' (as shown by the dashed-line circle) in the blue chrominance pattern 333 is compensated. Blue pixels ($Cb_1$ and $Cb_2$) adjacent to the non-blue pixel Cb' to be compensated are added together and an average value thereof is calculated. Then, the generated average value is taken as a value for the non-blue pixel to be compensated. In other words, the compensation value for the non-blue pixel is $$Cb' = \frac{Cb_1 + Cb_2}{2}$$

Third State:

Referring to FIG. 6c, the distribution shown in the dashed-line rectangle is defined as a third distribution state of blue pixels, and a non-blue pixel Cb' (as shown by the dashed-line circle) in the blue chrominance pattern 333 is compensated. Blue pixels ($Cb_1$ and $Cb_2$) adjacent to the non-blue pixel Cb' to be compensated are added together and an average value thereof is calculated. Then, the generated average value is taken as a value for the non-blue pixel to be compensated. In other words, the compensation value for the non-blue pixel is $$Cb' = \frac{Cb_1 + Cb_2}{2}$$

Figure 6D:
FIG. 6d is a schematic view of all non-blue pixels in the blue chrominance pattern after completing the compensation.

Finally, the above non-blue pixel is filled into a corresponding position in the blue chrominance pattern 333. FIG. 6d is a schematic view of all non-blue pixels in the blue chrominance pattern after completing the compensation.

Then, the compensated green chrominance pattern 3311, the compensated red chrominance pattern 3321, and the compensated blue chrominance pattern 3331 are respectively added to the luminance pattern to generate a green image signal pattern, a red image signal pattern, and a blue image signal pattern (Step S270). In order to clearly illustrate the adding operation between the luminance pattern 320 and each chrominance pattern, the green chrominance pattern 331 is taken as an example for demonstration. The operation is as shown in Equation 10 below.

$$G_{ij} = L_{ij} + Cg_{ij} \qquad \text{Equation 10}$$

In Equation 10, $G_{ij}$ is a pixel position (i, j) in a green image signal pattern, $L_{ij}$ is a pixel position (i, j) in the luminance pattern, and $Cg_{ij}$ is a pixel position (i, j) in a green chrominance pattern.

Figure 7A:
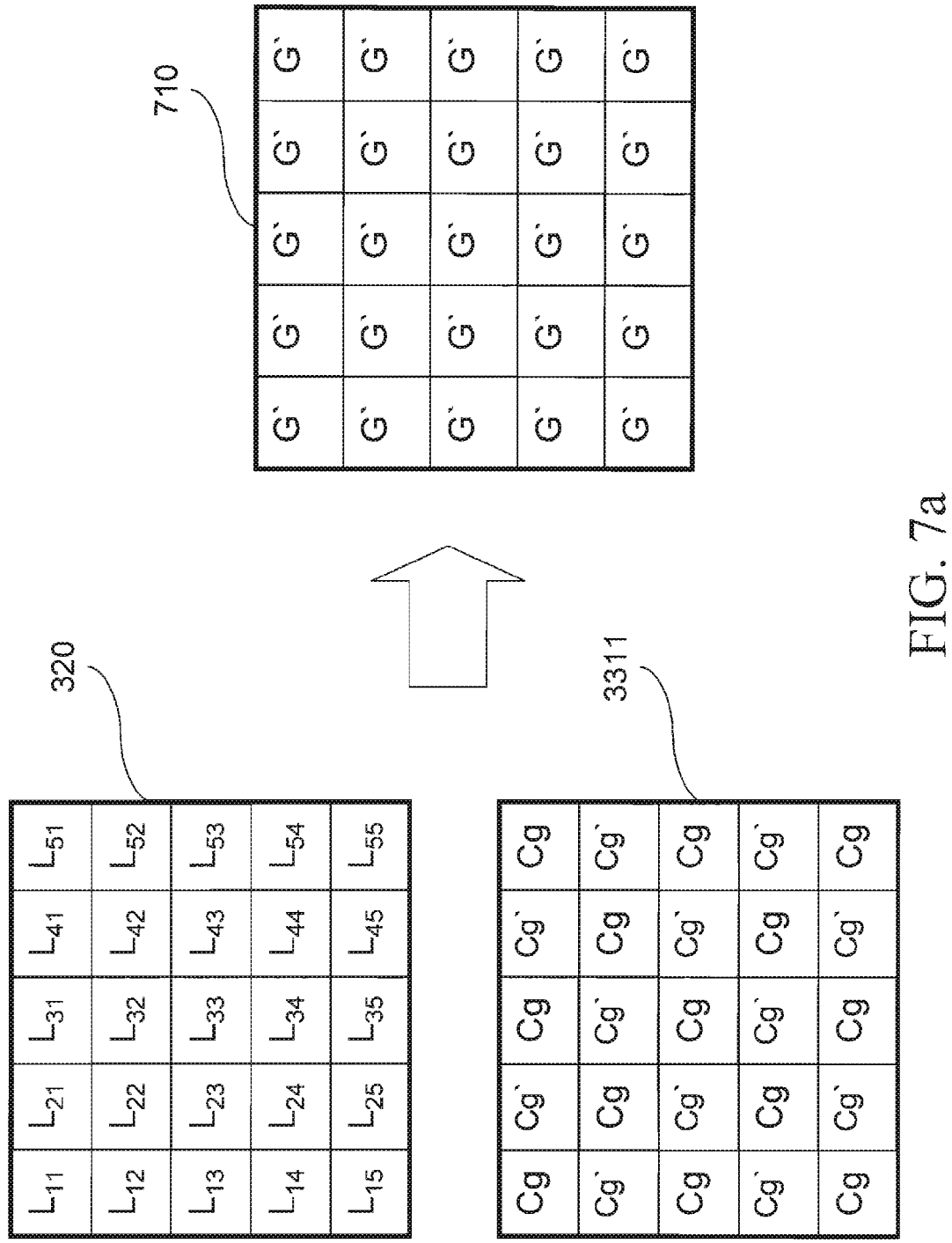
FIG. 7a is a schematic view of a green image signal pattern.
Figure 7B:
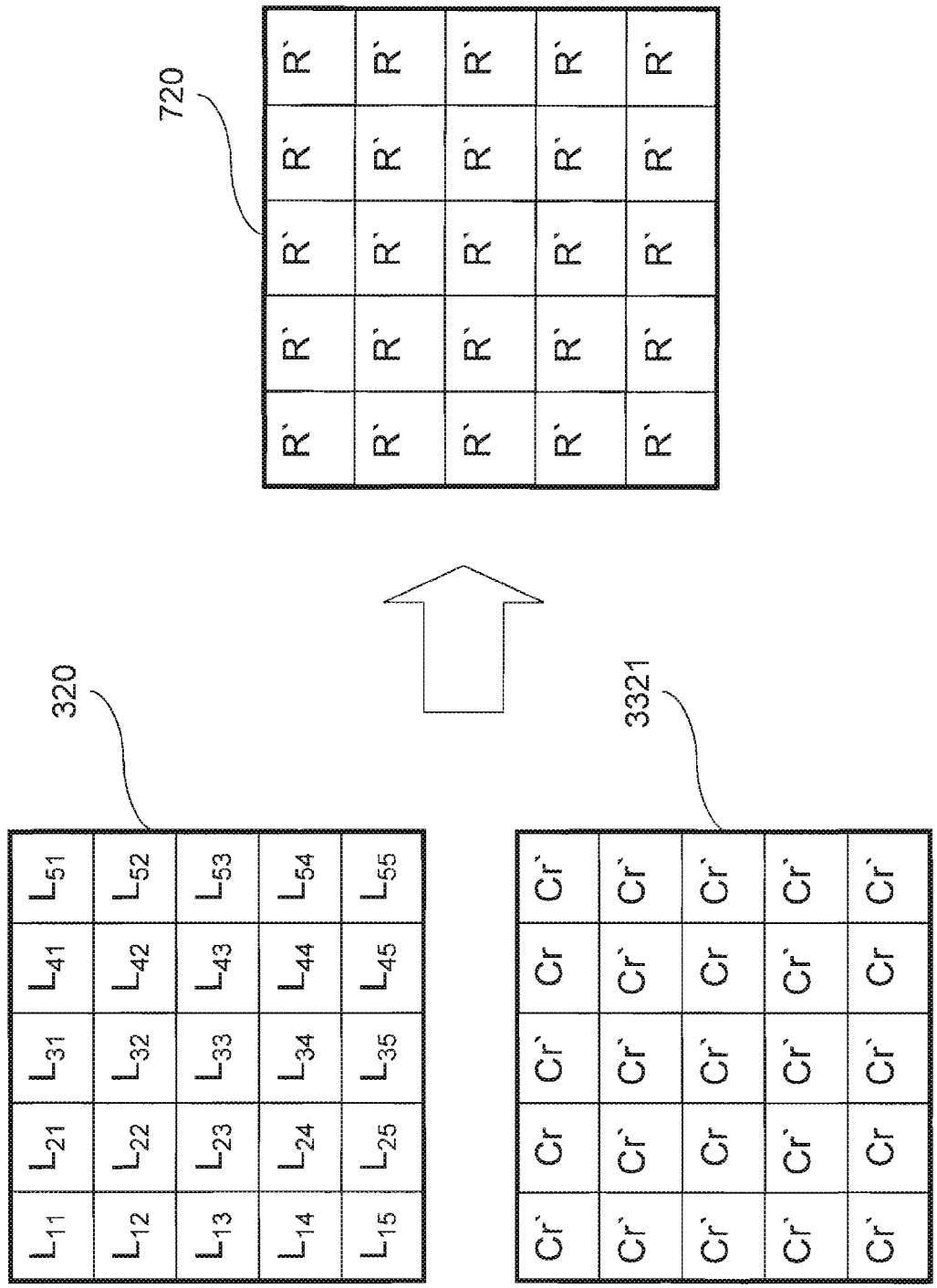
FIG. 7b is a schematic view of a red image signal pattern.
Figure 7C:
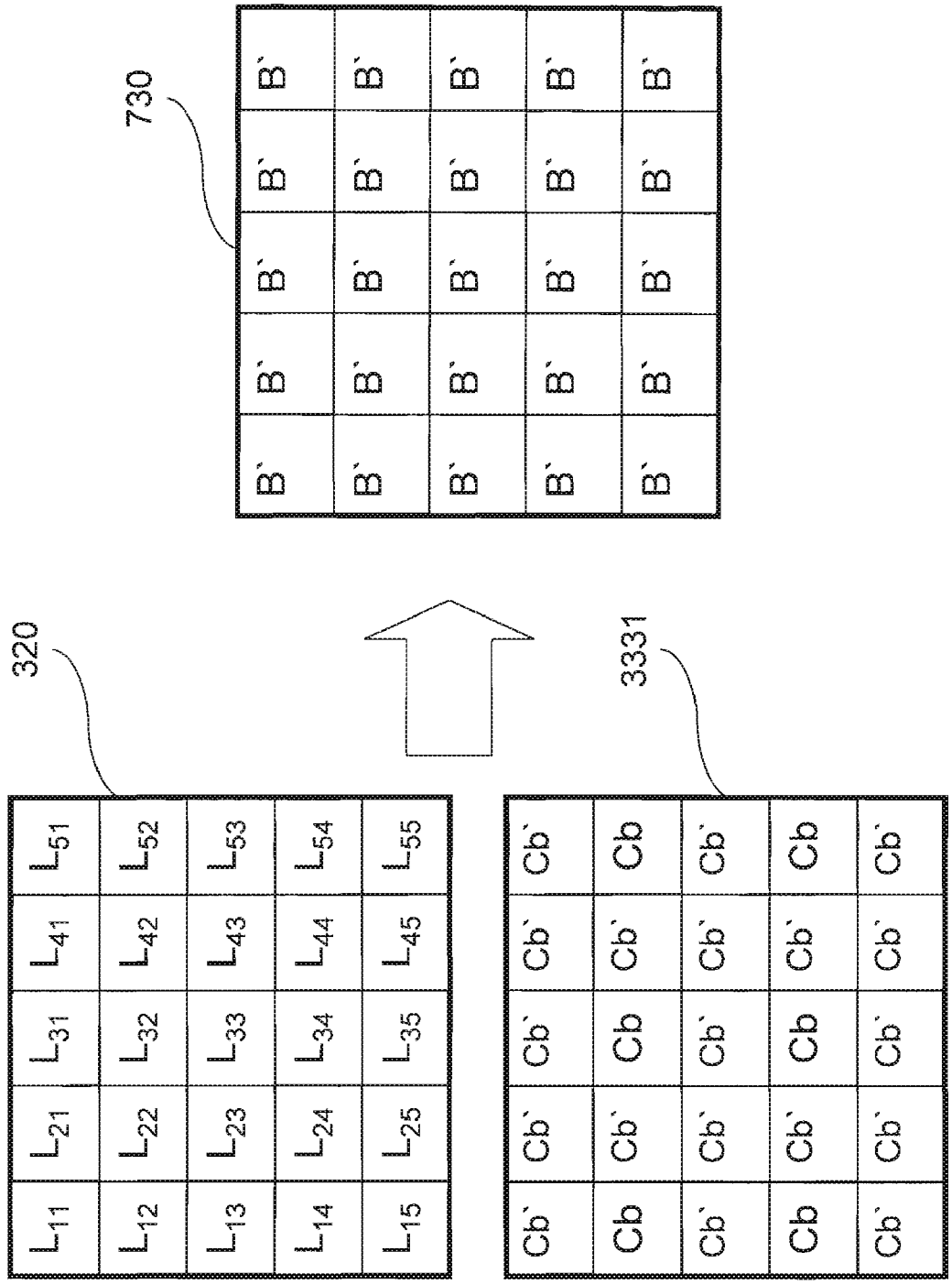
FIG. 7c is a schematic view of a blue image signal pattern.
Figure 8:
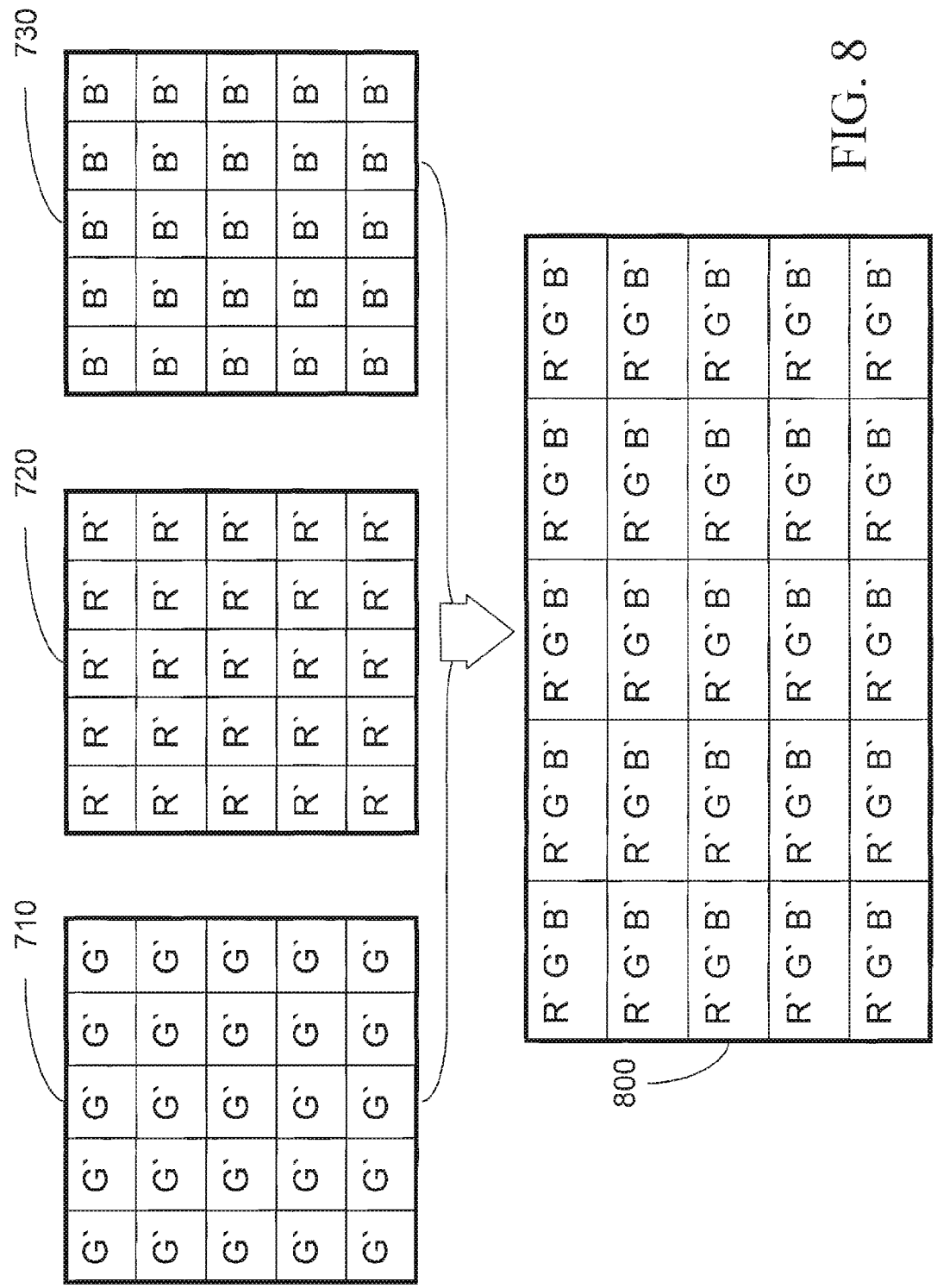
FIG. 8 is a schematic view of a motion for synthesizing an output image.

FIG. 7a is a schematic view of a green image signal pattern. Likewise, the compensated red chrominance pattern 3321 and the compensated blue chrominance pattern 3331 are respectively added to the luminance pattern to generate a red image signal pattern 720 as shown in FIG. 7b and a blue image signal pattern 730 as shown in FIG. 7c. Finally, the green image signal pattern, the red image signal pattern, and the blue image signal pattern are synthesized to generate an output image (Step S280). FIG. 8 is a schematic view of a motion for synthesizing an output image. Referring to FIG. 8, the adder 280 adds the green image signal pattern 710, the red image signal pattern 720, and the blue image signal pattern 730 together to generate an output image 800.

What is claimed is:

1. A color interpolation method for a digital image, adapted to perform a pixel interpolation on a digital image according to a Bayer pattern by a digital camera processor, the color interpolation method comprising:

setting a selection window in the Bayer pattern by the digital camera processor for selecting a plurality of color pixels therefrom;

filtering each pixel in the selection window by using a filter to generate a corresponding luminance pattern by the digital camera processor;

subtracting the luminance pattern from the Bayer pattern by the digital camera processor to generate a chrominance pattern;

decomposing the chrominance pattern into a green chrominance pattern, a red chrominance pattern, and a blue chrominance pattern by the digital camera processor;

performing a chrominance interpolation process on the green chrominance pattern, the red chrominance pattern, and the blue chrominance pattern respectively by the digital camera processor to obtain a compensated green chrominance pattern, a compensated red chrominance pattern, and a compensated blue chrominance pattern;

adding the compensated green chrominance pattern, the compensated red chrominance pattern, and the compensated blue chrominance pattern to the luminance pattern respectively by the digital camera processor, so as to generate a green image signal pattern, a red image signal pattern, and a blue image signal pattern; and generating an output image window according to the green image signal pattern, the red image signal pattern, and the blue image signal pattern by the digital camera processor.

2. The color interpolation method for a digital image according to claim 1, wherein the filter comprises a horizontal band-pass filter and a vertical band-pass filter, and the Bayer pattern is respectively processed by the horizontal band-pass filter and the vertical band-pass filter to generate a horizontal edge signal and a vertical edge signal.

3. The color interpolation method for a digital image according to claim 2, wherein the horizontal edge signal and the vertical edge signal are synthesized to generate the luminance pattern.

* * * * *